UNITED STATES PATENT OFFICE 2,533,003

1-METHYL - 3 - PIPERIDYLMETHYL 3-HYDROXY - 2 - PHENYLBUTANOATE, ITS SALTS AND PRODUCTION THEREOF

Rolland F. Feldkamp, Troy, N. Y., assignor to Sterling Drug Inc., New York, N. Y., a corporation of Delaware No Drawing. Application October 29, 1949, Serial No. 124,490

5 Claims. (Cl. 260—294.3)

This invention relates to a new basic ester, 1-methyl-3-piperidylmethyl 3-hydroxy-2-phenylbutanoate having the formula

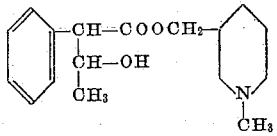

and to acid addition and quaternary ammonium salts thereof. This invention also relates to a process for preparing said basic ester.

My new compound, 1-methyl-3-piperidylmethyl 3 - hydroxy - 2 - phenyl - butanoate, has marked antispasmodic activity when tested in the form of a water-soluble salt.

1 - methyl - 3 - piperidylmethyl 3 - hydroxy-2-phenylbutanoate can be prepared by esterification of the corresponding alcohol, 1-methyl-3-piperidylmethanol, with 3-hydroxy-2-phenylbutanoic acid. The reaction of an acid halide of 3-hydroxy-2-phenylbutanoic acid with 1-methyl-3-piperidylmethanol is impractical because the acid halide cannot be prepared due to side reactions of the acid with acid halide forming reagents; this is due primarily to the free hydroxyl group in the acid. A satisfactory method was found whereby 1-methyl-3-piperidylmethanol is heated with the free acid, 3-hydroxy-2-phenylbutanoate, in a water-immiscible inert solvent of boiling point 60–140° C., preferably in the presence of an acid catalyst, with means for removing the water formed in the reaction. A convenient method of carrying out this procedure comprises prolonged heating the alcohol with the acid in benzene solution in the presence of gaseous hydrogen chloride using a water separator to remove the water from the refluxing vapors and thus shift the equilibrium in the direction of the desired ester. The volume of water formed also serves to indicate the extent of the reaction.

Benzene is the preferred solvent, but other water-immiscible solvents such as toluene and xylene can be used. The acid catalyst can be a gas such as hydrogen chloride or hydrogen bromide in which case it is bubbled through the mixture in comparatively large quantities. If the acid catalyst is a liquid or solid such as concentrated sulfuric acid, benzenesulfonic acid, paratoluenesulfonic acid, etc., it can be added in quantity slightly in excess of that necessary to neutralize the 1-methyl-3-piperidylmethanol; the corresponding acid-addition salt of 1-methyl-3-piperidylmethyl 3-hydroxy-2-phenylbutanoate is then formed.

If gaseous hydrogen chloride or hydrogen bromide is used as the acid catalyst, the hydrochloride or hydrobromide respectively of 1-methyl-3-piperidylmethyl 3-hydroxy-2-phenylbutanoate is formed directly. The free basic ester itself can be obtained by addition of an alkaline reagent to these salts. Other suitable acid addition salts can be obtained by reaction of the free basic ester with an acid, preferably in an inert solvent such as benzene or ether. For example, nitric acid, sulfuric acid, hydriodic acid, tartaric acid, acetic acid, citric acid, lactic acid, benzenesulfonic acid and p-toluenesulfonic acid give respectively the nitrate, sulfate, hydroiodide, tartrate (or bitartrate), acetate, citrate, lactate, benzenesulfonate, and p-toluenesulfonate.

The quaternary ammonium salts are formed by admixture of the basic ester with alkyl or aralkyl esters of strong inorganic or organic acids usually in an inert organic solvent such as ether, benzene or ethyl acetate. The reaction occurs merely by allowing the mixture to stand for a day or two, but it may be accelerated by gentle heating. The following example will illustrate my invention more fully.

EXAMPLE

A. 1-methyl-3-piperidylmethyl 3-hydroxy-2-phenylbutanoate

A mixture of 69.4 g. (0.385 mole) of 3-hydroxy-2-phenylbutanoic acid, 49.8 g. (0.385 mole) of 1-methyl-3-piperidylmethanol and 300 cc. of benzene was placed in a one-liter flask fitted with a water separator, condenser, submerged gas inlet tube and a calcium chloride drying tube. The temperature was then raised until the mixture was refluxing, and a moderate stream of hydrogen chloride gas was introduced. A total of 7 cc. of water separated during 15 hours of subsequent refluxing. The heterogeneous mixture was transferred to a beaker, and the solvent was removed by evaporation in a stream of air. The sirupy residue of the hydrochloride of 1-methyl-3-piperidylmethyl 3-hydroxy-2-phenylbutanoate was repeatedly washed with fresh portions of ether and then dissolved in water. The solution was made basic by addition of solid sodium carbonate, and the liberated base, 1-methyl-3-piperidylmethyl 3-hydroxy-2-phenylbutanoate, was extracted with ether. The combined ether extract was dried over anhydrous magnesium sulfate.

B. 1-methyl-3-piperidylmethyl 3-hydroxy-2-phenylbutanoate methobromide

The ether extract of 1-methyl-3-piperidylmethyl 3-hydroxy-2-phenylbutanoate from part A was filtered, and the filtrate was diluted to 700 cc. with ether and treated with 300 cc. of an ether solution of 93.5 g. (0.98 mole) of methyl bromide. Stirring and cooling initiated the separation of a gum which gradually solidified. After cooling for 24 hours at 0° C., 112 g. (75.3%) of crude solid was collected by filtration. Recrystallization from a mixture of ethanol and ether, using activated charcoal, gave 92 g. of 1-methyl-3-piperidylmethyl 3-hydroxy-2-phenylbutanoate methobromide, M. P. 187–190° C.

Anal.—Calcd. for $C_{18}H_{28}BrNO_3$: Br, 20.64; C, 55.90; H, 7.31. Found: Br, 20.62; C, 55.84; H, 7.05.

C. *1-methyl-3-piperidylmethyl 3-hydroxy-2-phenylbutanoate methiodide*

When the process of part B was carried out using methyl iodide instead of methyl bromide, 1-methyl-3-piperidylmethyl 3 - hydroxy-2-phenylbutanoate methiodide is obtained, M. P. 158–162° C.

Anal.—Calcd. for $C_{18}H_{28}INO_3$: I, 29.23; C, 49.8; H, 6.52. Found: I, 29.25; C, 49.50; H, 6.55.

This application is a continuation-in-part of my copending application, Serial Number 122,366, filed October 19, 1949.

I claim:

1. A compound selected from the group consisting of 1-methyl-3-piperidylmethyl 3-hydroxy-2-phenylbutanoate having the formula

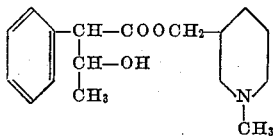

and acid addition and quaternary ammonium salts thereof.

2. 1 - methyl-3-piperidylmethyl 3 - hydroxy-2-phenylbutanoate methobromide.

3. 1 - methyl-3-piperidylmethyl 3 - hydroxy-2-phenylbutanoate methiodide.

4. The process for preparing an acid-addition salt of 1-methyl-3-piperidylmethyl 3-hydroxy-2-phenylbutanoate which comprises heating 1-methyl-3-piperidylmethanol with 3-hydroxy-2-phenylbutanoic acid in a water-immiscible inert solvent of boiling point 60–140° C. in the presence of an acid catalyst, while removing the water as formed from the solvent vapors.

5. The process for preparing 1-methyl-3-piperidylmethyl 3-hydroxy-2-phenylbutanoate hydrochloride which comprises heating 1-methyl-3-piperidylmethanol with 3-hydroxy-2-phenylbutanoic acid in benzene solution in the presence of hydrogen chloride gas, while removing the water as formed from the benzene vapors.

ROLLAND F. FELDKAMP.

No references cited.